(12) United States Patent
Davis et al.

(10) Patent No.: US 7,922,416 B2
(45) Date of Patent: Apr. 12, 2011

(54) PORTABLE LOCKING SUPPORT STRUCTURE

(75) Inventors: Adam Davis, Lancaster, PA (US); Michael Tait, Lititz, PA (US); James Fairorth, Lancaster, PA (US)

(73) Assignee: Tait Towers, Lititz, PA (US)

( * ) Notice: Subject to any disclaimer, the term of this patent is extended or adjusted under 35 U.S.C. 154(b) by 60 days.

(21) Appl. No.: 12/388,645

(22) Filed: Feb. 19, 2009

(65) Prior Publication Data

US 2009/0148228 A1 Jun. 11, 2009

Related U.S. Application Data

(62) Division of application No. 11/295,999, filed on Dec. 7, 2005, now Pat. No. 7,703,401.

(51) Int. Cl.
*F16B 21/00* (2006.01)
(52) U.S. Cl. ............... 403/322.1; 403/361; 403/DIG. 6; 403/109.3; 403/378
(58) Field of Classification Search ............... 403/322.1, 403/328, 361, DIG. 6, 109.3, 378; 16/18 A, 16/30, 43; 279/29, 30, 75
See application file for complete search history.

(56) References Cited

U.S. PATENT DOCUMENTS

| | | | |
|---|---|---|---|
| 1,743,143 A * | 1/1930 | Johnson | 16/43 |
| 2,258,377 A * | 10/1941 | Collins | 403/20 |
| 2,290,215 A * | 7/1942 | Stenberg | 403/DIG. 6 |
| 2,336,095 A * | 12/1943 | Heding | |
| 2,354,906 A | 8/1944 | Bailey et al. | |
| 2,673,700 A | 3/1954 | Eberhardt | |
| 2,833,607 A | 5/1958 | MackIntosh | |
| 2,946,634 A | 7/1960 | Gilbert | |
| 3,082,843 A | 3/1963 | Leonard | |
| 3,181,203 A | 5/1965 | Wenger | |
| 3,400,671 A | 9/1968 | Erismann | |
| 3,968,606 A | 7/1976 | Facemire | |
| 4,104,835 A | 8/1978 | Bardwick, III | |
| 4,150,630 A | 4/1979 | Pokorny et al. | |
| 4,290,617 A * | 9/1981 | Yoshida | 279/75 |
| 4,638,604 A | 1/1987 | Rogers et al. | |
| 4,701,083 A * | 10/1987 | Deutschenbaur et al. | |
| 4,759,162 A | 7/1988 | Wyse | |
| 4,843,792 A | 7/1989 | Rogers et al. | |
| 4,845,915 A | 7/1989 | Rogers et al. | |
| 4,902,177 A * | 2/1990 | Burnett | |
| 4,917,217 A | 4/1990 | Rogers et al. | |
| 4,938,622 A * | 7/1990 | Stoerzbach | 403/341 |
| 5,074,085 A | 12/1991 | Ueda | |
| 5,205,087 A | 4/1993 | Jines | |
| 5,205,101 A | 4/1993 | Swan et al. | |
| 5,319,906 A | 6/1994 | Hayden | |

(Continued)

*Primary Examiner* — Victor MacArthur
(74) *Attorney, Agent, or Firm* — McNees Wallace & Nurick LLC

(57) ABSTRACT

A portable support structure including a platform member having a primary platform connector and a secondary platform connector. The primary platform connector is configured to receive a primary support connector. The secondary platform connector is configured to receive a secondary support connector. The support structure also includes a primary support member including the primary support connector and a hook member. In addition, the support structure includes a secondary support member having a first end and a second end. The first end is detachably engaged with the secondary platform connector and the second end is in locking engagement with the hook member. The primary support connector includes structures that engage the primary platform connector and rotationally position the primary support member. The hook member includes a hook portion that engages and prevents the secondary support member disengaging upon a rotation of the secondary support member.

4 Claims, 13 Drawing Sheets

U.S. PATENT DOCUMENTS

| | | |
|---|---|---|
| 5,323,563 A | 6/1994 | Rogers et al. |
| 5,323,564 A | 6/1994 | Mensching et al. |
| 5,408,790 A | 4/1995 | Hoesten et al. |
| 5,483,900 A | 1/1996 | Elzenbeck |
| 5,605,204 A | 2/1997 | Ausejo |
| 5,848,501 A | 12/1998 | Taipale et al. |
| 6,027,276 A | 2/2000 | Schworer |
| 6,212,733 B1 * | 4/2001 | Yeh ................................. 16/43 |
| 6,568,382 B2 * | 5/2003 | Martin et al. .............. 403/322.2 |
| 6,581,339 B2 | 6/2003 | Thiede |
| 6,847,009 B2 * | 1/2005 | Stuart et al. |

* cited by examiner

PORTABLE LOCKING SUPPORT STRUCTURE

CROSS REFERENCE TO RELATED APPLICATIONS

This application is a divisional of U.S. application Ser. No. 11/295,999, filed Dec. 7, 2005, which is incorporated by reference in its entirety.

FIELD OF THE INVENTION

The present invention is directed to portable support structures. In particular, the present invention is directed to a portable stage or platform.

BACKGROUND OF THE INVENTION

Portable structures, such as stages or platforms, must be capable of breaking down into relatively small units that can be loaded onto trucks or airplanes for transport. In addition, the portable structures must be capable of assembly in a short amount of time, by personnel having little or no technical skill. The above benefits must be provided while providing a platform that is capable of holding a large amount of weight and does not sway or bend during use.

Locking mechanisms for supports have typically utilized pins and/or latches. The locking mechanisms for supports known in the art suffer from the drawback that they are difficult to assemble, are subject to misalignment, causing instability in the platforms, and require a plurality of pieces, each of which must be assembled together to produce the platform.

What is needed is a portable platform structure that is easily assembled and disassembled with little or no technical skill, having a stable structure that resists deflection when bearing a load, where the structure does not suffer from the drawbacks of the prior art.

SUMMARY OF THE INVENTION

The present invention includes a portable support structure including a platform member having a primary platform connector and a secondary platform connector. The primary platform connector is configured to receive a primary support connector. The secondary platform connector is configured to receive a secondary support connector. The support structure also includes a primary support member including the primary support connector and a hook member. In addition, the support structure includes a secondary support member having a first end and a second end. The first end is detachably engaged with the secondary platform connector and the second end is in locking engagement with the hook member. The primary support connector includes a tapered portion and an alignment portion. The tapered portion engages a surface in the primary platform connector and the alignment portion engages an alignment member disposed in the primary platform connector. The engagement of the primary support connector with the primary platform connector rotationally positions the primary support member.

Another embodiment of the present invention includes a portable support structure including a platform member having a primary platform connector and a secondary platform connector. The primary platform connector is configured to receive a primary support connector. The secondary platform connector is configured to receive a secondary support connector. The support structure also includes a primary support member including the primary support connector and a hook member. In addition, the support structure includes a secondary support member having a first end and a second end. The first end is detachably engaged with the secondary platform connector and the second end is in locking engagement with the hook member. The hook member includes a hook portion having a geometry capable of receiving the second end of the secondary support member. In addition, the hook portion engages the secondary support member in a position that prevents disengagement when the secondary support member is rotated.

Still another embodiment of the present invention includes a connector system for connecting components for assembly of a support structure. The connector system includes a support connector having a tapered portion and an alignment portion. In addition, the connector system includes a platform connector having a cavity configured to receive the support connector. The tapered portion engages a surface in the platform connector and the alignment portion engages an alignment member disposed in the primary platform connector to rotationally position the support connector.

Still another embodiment of the present invention includes a connector system for connecting components for assembly of a support structure. The connector system includes a body configured to attach to a first support member. A hook portion is attached to the body and has a geometry that is capable of receiving a secondary support member. In addition, the hook portion engages the secondary support member in a position that prevents disengagement when the secondary support member is rotated.

One advantage of the present invention is that support structures, such as stages or platforms may be assembled and disassembled repeatedly, while providing a substantially rigid support structure that may support a substantial load when assembled.

Another advantage of the present invention is that the individual structural members individually may be interchanged, reducing the possibility for assembly error in the assembly of the multi-level structure.

Still another advantage of the present invention is that the load applied to the platform is supported by the support structure, allowing the structure to maintain stability, without swaying or bending, including when lateral forces are present.

Yet another advantage of the present invention is that the structure members are configured to prevent misalignment, allowing personnel having little or no technical skill to correctly align the various components while maintaining a structure that is stable and is resistant to swaying or bending.

Still yet another advantage of the present invention is that a force is provided that retains the primary support member in position during installation, making the installation easier and does not undesirably disassemble when the platform structure is lifted.

A further advantage of the present invention is that an assembler of the portable support structure may position and lock the secondary support member while remaining in a standing position, making the installation quicker and less burdensome on the assembler.

A further advantage of the present invention is that the portable support structure occupies less space when disassembled than stages previously known in the art, permitting the use of less storage space, providing further advantages, such as fewer tractor-trailers to transport the stage by land, less cargo space in aircraft when transporting the portable support structure by air and less overall transportation costs.

A further advantage of the present invention is that the secondary support members may be installed subsequent to the installation of the primary support members, and may be omitted in applications where the primary support members provide sufficient support for the platform members.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
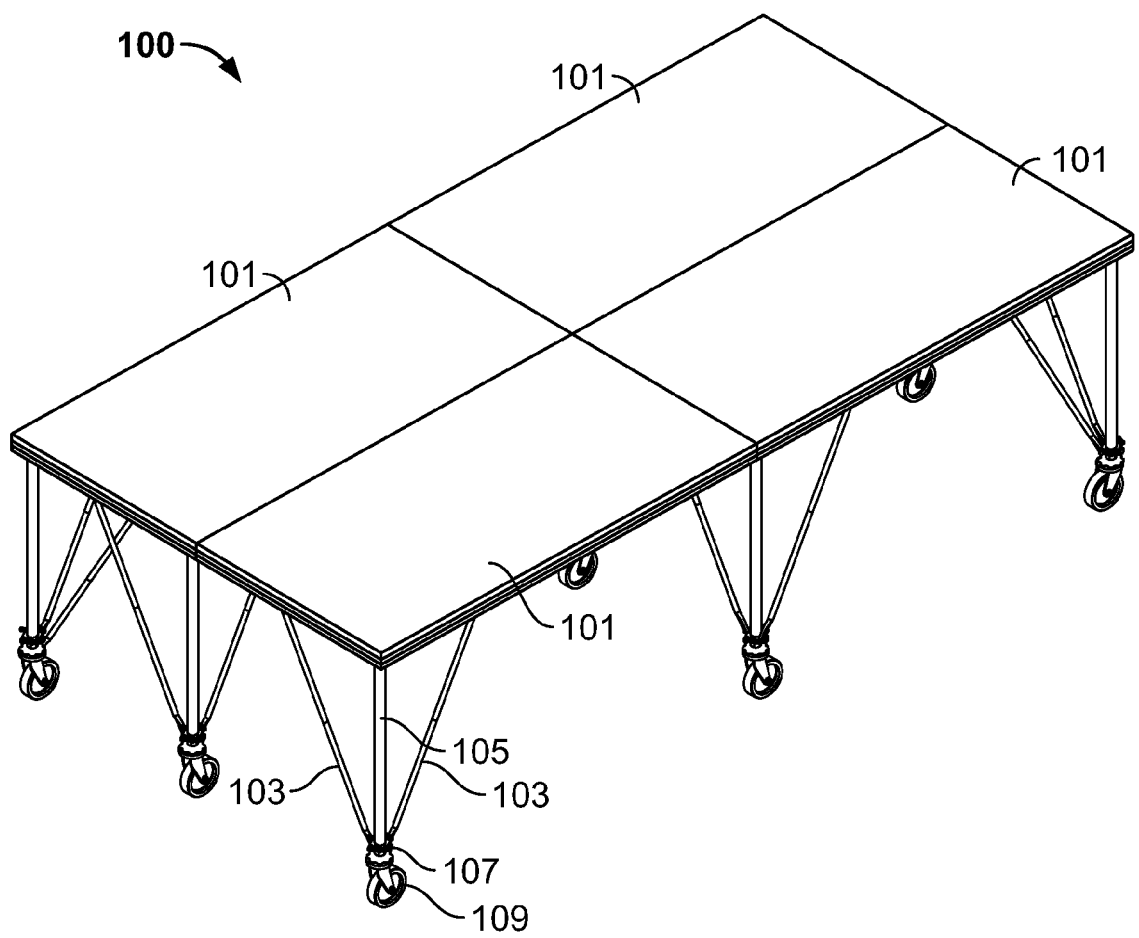
FIG. 1 shows a perspective view of a portable support structure according to an embodiment of the present invention.

FIG. 1 shows an assembled portable support structure 100 having a continuous surface formed from a plurality of platform members 101 attached to each other along one or more surfaces that may be disassembled into smaller components, which preferably have a size and geometry suitable for storage or transportation. Platform members 101 may attach to each other by any suitable means including, but not limited to, latches, fasteners or other attachment devices that may be disassembled for storage or transportation. The smaller components may include single platform members 101 having associated primary support members 105 and secondary support members 103. The primary support member 105 is preferably a leg, column, tube, cylinder or other elongated structure provided at a substantially perpendicular angle to the platform member 101 capable of bearing a load from the platform member 101. The secondary support member 103 is preferably bar, tube, cylinder or other elongated structure provided at an angle to the platform member 101 for providing lateral support to the primary support member 105. The portable support structure 100 includes platform members 101, primary support members 105 and secondary support members 103 disattachably connected to provide structural support for the platform member 101. As used herein, "detachably engaged" or the like refers to the ability to disconnect support members without having to first change the angular orientation between the support, i.e., rotate one support member with respect to the other support member. The primary support members 105 are detachably engaged to a primary platform connector 401 (see e.g., FIG. 4), which is attached to platform member 101. Engagement between components of the present invention includes interlocking of the components and/or contact between components, and may include retention of one or more components in a given position either by force of gravity or by interaction between mechanical components, which may be released or detached with the application of a force by hand or by mechanical device. Although platform member 101 is shown with a rectangular geometry, the present invention is not limited to a rectangular geometry. The platform member 101 may be fabricated into any geometry that provides the desired support for the portable support structure 100 and is easily stored and/or transported. The secondary support members 103 are detachably engaged at one end with the secondary platform connector 403 (see FIG. 4). The secondary support members 103 are also in locking engagement with hook member 107 attached to the primary support member 105. As used herein, "locking engagement" refers to an engagement between support members that can only be supported by changing the angular orientation of one support member with respect to the other support member, i.e., by rotation. A rotatable wheel or caster 109 may be included at one end of the primary support member 105 in order to provide the portable support structure 100 with added mobility. Although the primary support member 105 has been shown including a caster 109, the present invention is not limited to a caster 109. The primary support member 105 may be any suitable structure for contacting a foundation surface, including, but not limited to, a fixed wheel, a skid, footing or other structure suitable for providing support and transferring and distributing the load provided by the portable support structure 100.

Figure 2:
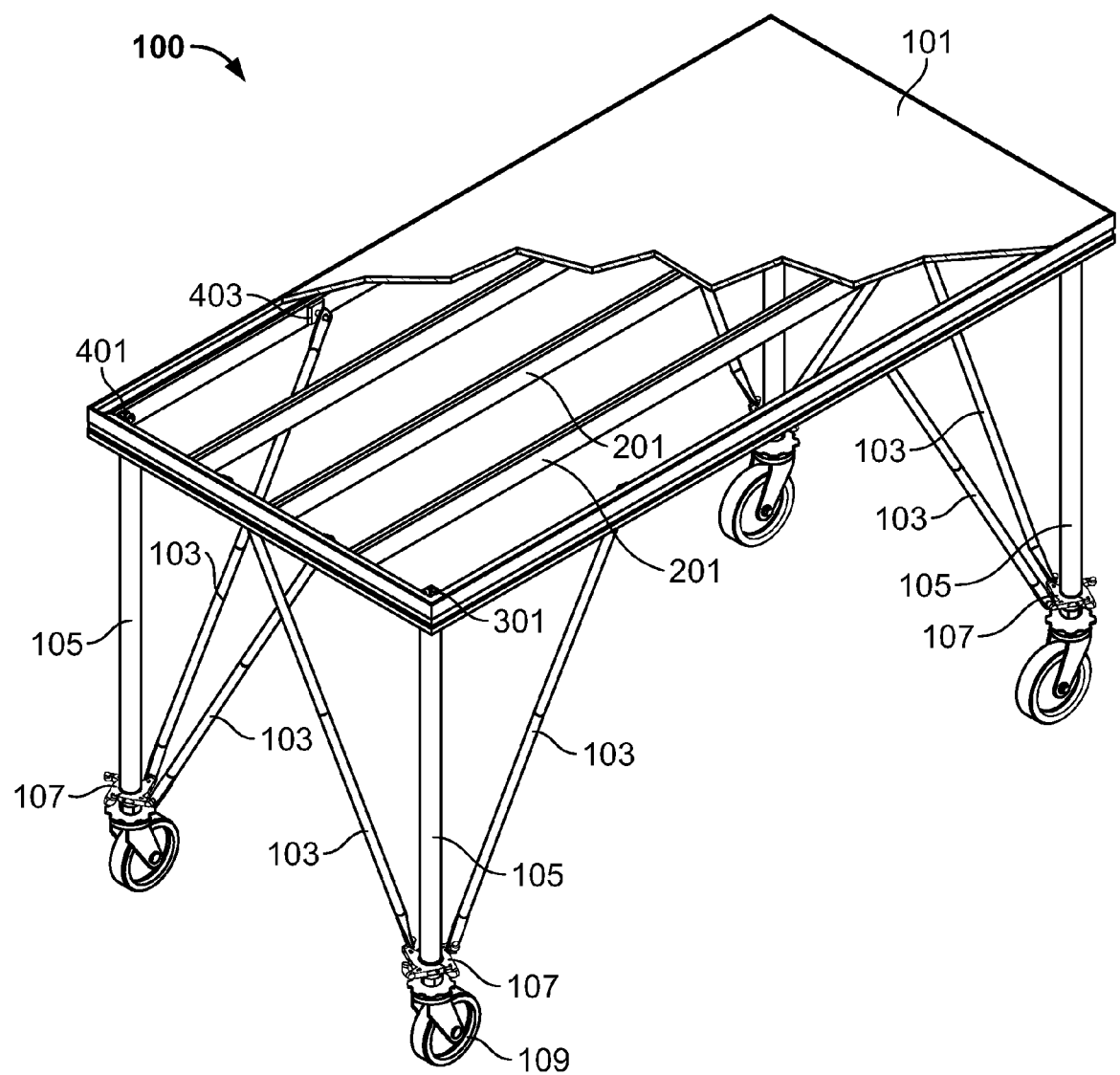
FIG. 2 shows a perspective cutaway view of a portable support structure according to an embodiment of the present invention.

FIG. 2 shows a unit including only a single platform member 101 from the portable support structure 100. Platform member 101 may include platform supports 201 in order to provide additional support over the length of the platform member 101. Like shown and described with respect to FIG. 1, connection of primary platform connector 401 to the platform member 101 is detachably engaged with a primary support connector 301. Likewise, secondary support members 103 are detachably engaged with the secondary platform connector 403. In addition, secondary support members 103 are in locking engagement with the hook member 107 attached to the primary support member 105. The single unit having the four primary support members 105 and the eight secondary support member 103 shown in FIG. 2 is self supporting and may be moved as a unit when being assembled with other units and may be attached to other units having platform members 101, as shown and described with respect to FIG. 1. The number of primary support members 105 and secondary support members 103 is not limited to the arrangement shown in FIG. 2. Any number of primary support members 105 and secondary support member 103 supporting the platform member 101 may be used in the portable support structure according to the present invention. In addition, some or all of the secondary support members 105 may be omitted, where the support provided by the primary support member 105 is sufficient to provide the desired support the platform member 101.

Figure 3:
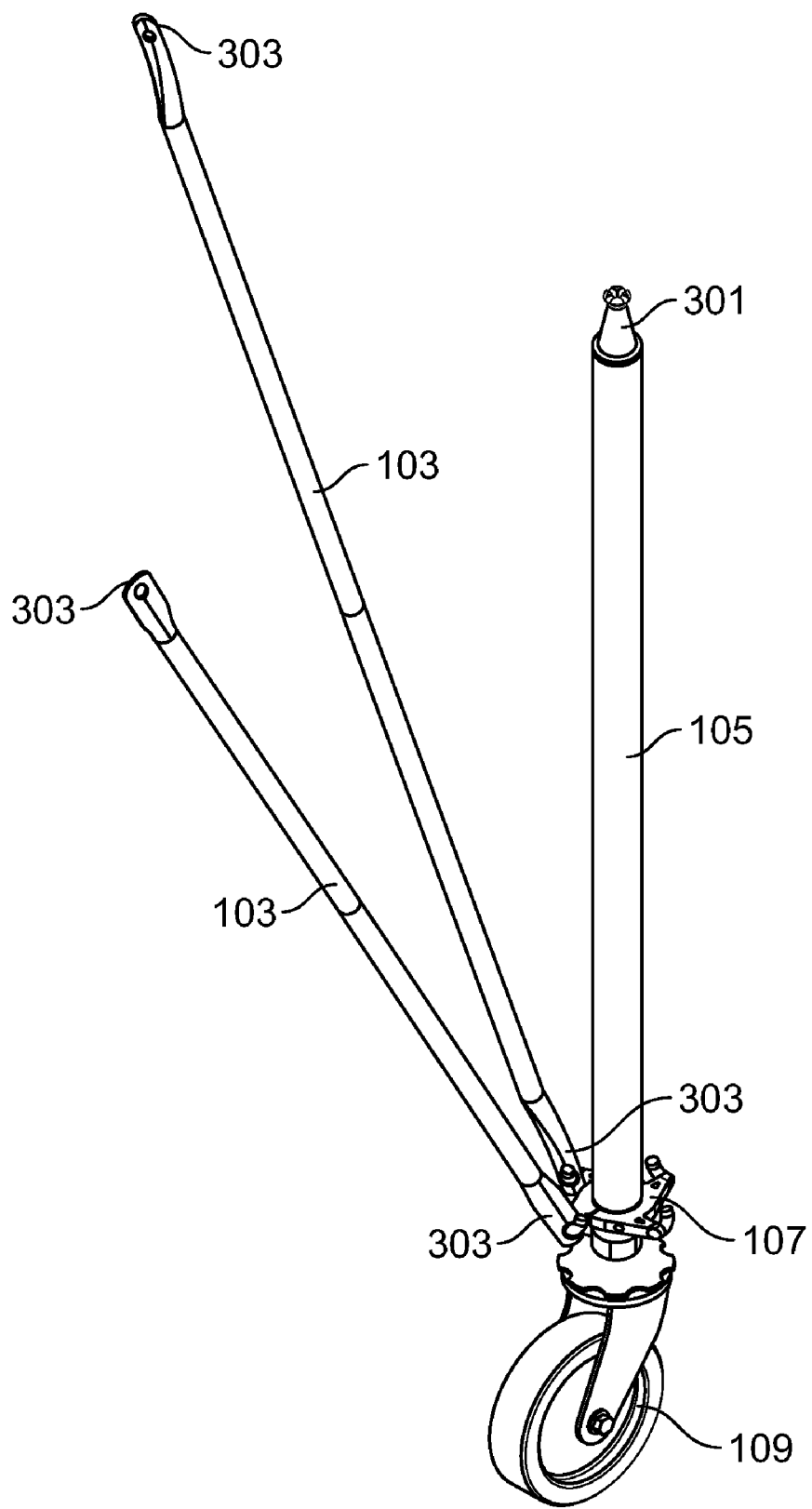
FIG. 3 shows a perspective view of a primary and secondary support system according to an embodiment of the present invention.

FIG. 3 shows a more detailed view of the components of the portable support structure 100 with the platform member 101 removed. As shown in FIGS. 1 and 2, the secondary support members 103 are in locking engagement with the hook member 107, which is preferably attached adjacent to one end of the primary support member 105. In addition, FIG. 3 shows a primary support connector 301 at one end of the primary support member 105, preferably opposite the hook member 107. Primary support connector 301 has a geometry that detachably engages the primary platform connector 401 (not shown in FIG. 3), which is attached to the platform member 101 (see FIG. 4). Further, FIG. 3 shows a secondary support connector 303 at each end of the secondary support member 103. The secondary support connector 303 detachably engages the secondary platform connector 403 (not shown in FIG. 3), which is attached to the platform member 101 (see FIG. 4). In addition, secondary support connector 303 is in locking engagement with the hook member 107. The secondary support connector 303 may be an eyelet, as shown in FIG. 3, but may include any suitable structure suitable for detachably engaging the secondary platform connector 403.

Figure 4:
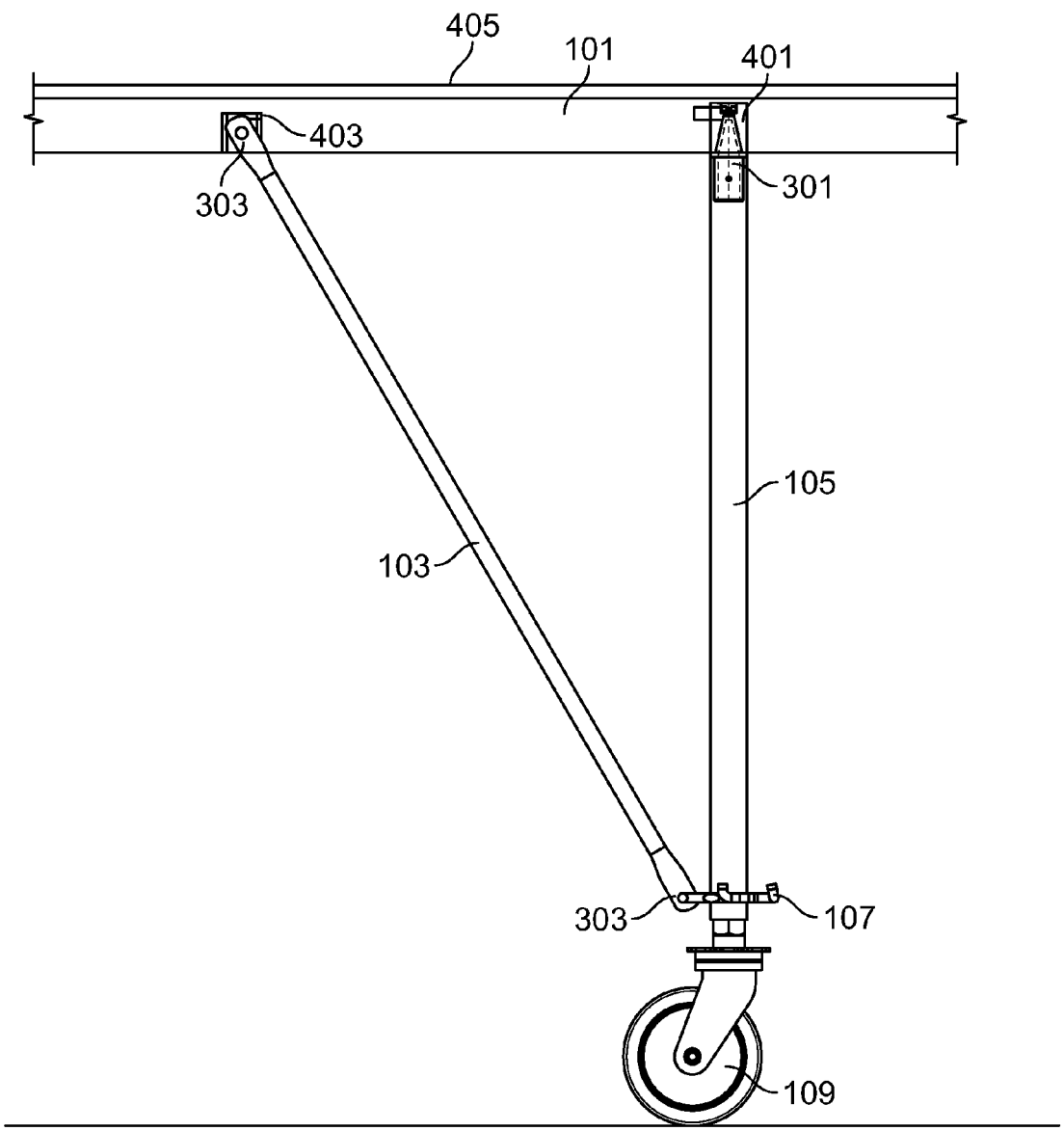
FIG. 4 shows a cutaway view of a portable support structure according to an embodiment of the present invention.

FIG. 4 shows a cutaway view of the portable support structure 100. The primary support connector 301 at one end of the primary support member 105 is detachably engaged with a primary platform connector 401. The secondary support connector 303 of the secondary support member 103 is detachably engaged with the secondary platform connector 403. The secondary support connector 303 distal from the end of the secondary support member 103 engaged with the secondary platform connector 403 is in locking engagement to the hook member 107. The secondary support connector 403 at the distal end of the secondary support member 103 from the hook member 107 is engaged with the secondary platform connector 403 and is capable of providing non-vertical support for the primary support member 105. The angle of the support member 103 with respect to the primary support member 105 is preferably an angle of sufficient magnitude to maintain a platform surface 405 suitable for use as a stage, platform, decking or other raised structure that is capable of bearing the weight of equipment and/or people.

Figure 5:
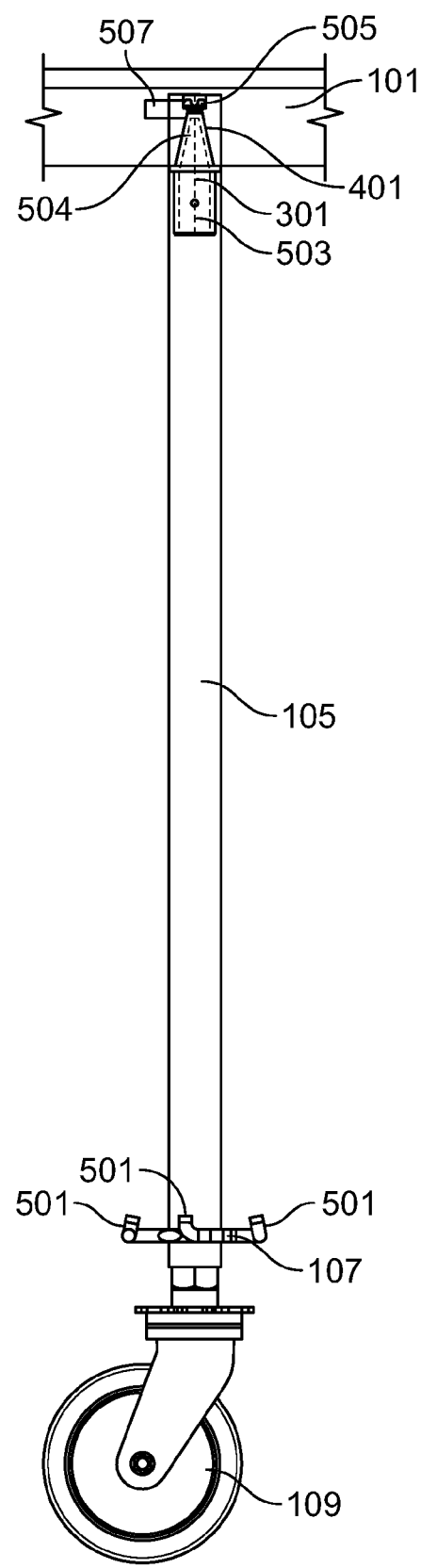
FIG. 5 shows a primary support member according to an embodiment of the present invention.

FIG. 5 shows an enlarged, more detailed, cutaway view of the portable support structure 100 without a secondary support member 103. The primary support connector 301 is detachably engaged with primary platform connector 401. The primary platform connector 401 includes a retention device 507, which provides a retaining force on the primary support connector 301, which detachably retains engagement of the primary support connector 301 and the primary support member 105, particularly during assembly of the portable structure support system 100. Although the retention device 507 provides sufficient force to retain engagement of the primary support member 105, and the primary support connector 301, the retention device 507 is releasable under a force, such as a manual force that would be applied by hand or by mechanical device during disassembly of the portable structure support system 100. The primary support connector 301 includes an attachment portion 503, a tapered portion 504 and an alignment member 505. The attachment portion 503 extends from the tapered portion 504 and provides a surface to which the primary support member 105 may be attached. The attachment portion 503 of the primary support connector 301 may be attached to the primary support member 105 by any suitable means, including, but not limited to, adhesive, welding, threaded engagement, cross pins, heat shrink fitting or other any other suitable attachment method. The tapered portion 504 preferably has a frusto-conical shape that engages the primary platform connector 401 and provides support to the platform member 101. The primary platform connector 401 provides a surface that engages the tapered portion 504 of the primary support connector 301 to distribute the force from the platform member and maintain the engagement of the primary platform connector 401 and the primary support connector 301. This primary support connector 401 geometry allows for little or no platform deflection of the primary support member 105 with respect to the platform member 101. Platform deflection is a change in the angle between the primary support member 105 and the platform member 101 when the platform member 101 is subjected to a load. Sources of deflection may include, for example, disengagement of the primary support connector 301 and the primary platform connector 401, a large load on the platform member 101 or a large lateral force on the platform member 101, substantially perpendicular to the primary support member 105.

FIG. 5 also shows primary support member 105 including hook member 107 attached at a position along the length of the primary support member 105, but preferably adjacent an end and opposite the attachment portion 503. The hook member 107 is positioned on the primary support member 105 such that a secondary support member 103 (See FIG. 4) may be placed in locking engagement with the hook member 107 and in detachable engagement with the secondary platform connector 403. The hook member 107 includes a plurality of hook portions 501 which may engage secondary support connector 303 in locking engagement. The attachment of the hook member 107 to the primary support member 105 may be any attachment means suitable for receiving force transferred by the secondary support member 103 when the secondary support member 103 is in locking engagement. Suitable attachment means for attaching the hook member 107 to the primary support member 105 include, but are not limited to, clamping, applying adhesive, set screws or other mechanical portions, heat shrink (thermal interference fit) or welding.

Figure 6A:
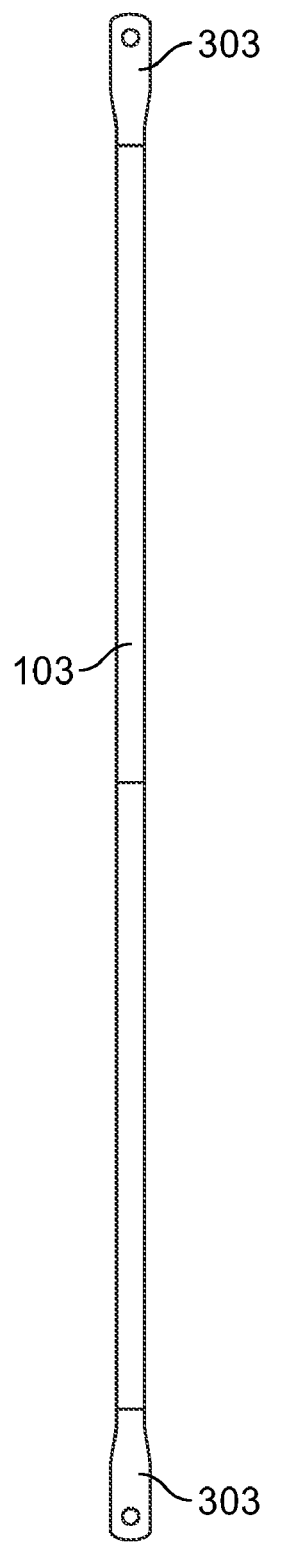
FIGS. 6A and 6B show respective top and side views of a secondary support member according to an embodiment of the present invention.
Figure 6B:
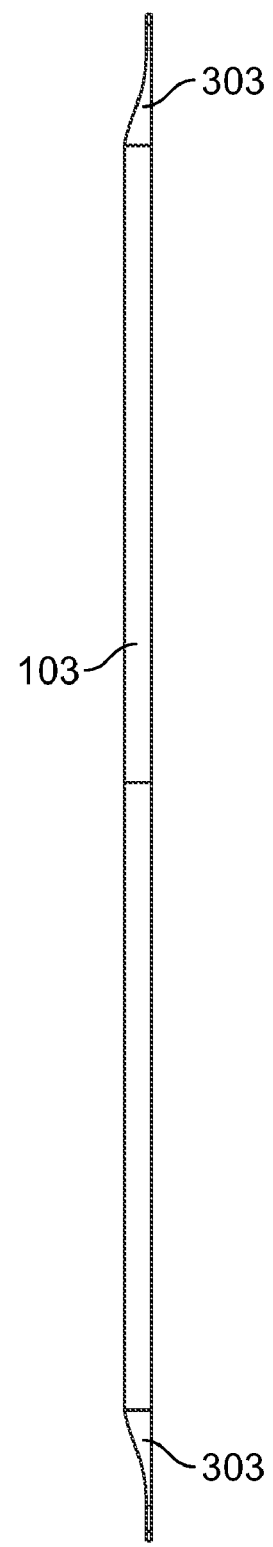

FIGS. 6A and 6B illustrate two views of a secondary support member 103 according to an embodiment of the invention. FIGS. 6A and 6B show support member 103 having a substantially cylindrical geometry including two ends that each include secondary support connectors 303 in the form of eyelets. The secondary support member 103 may have any suitable geometry that is capable of transferring force from the platform member 101 to the primary support member 105 when the portable support structure 100 is assembled (see, for example, FIG. 4). As discussed above with respect to FIG. 3, the secondary support connectors 303 may include any structure that is suitable for engaging the secondary platform connector 403 and the hook member 107 on the primary support member 105. The secondary support connectors 303 at the each end of the secondary support members 103 may be the same, or the secondary support connector 303 connectors may be different from each other. In addition, secondary support connectors 303 may be configured in any suitable geometry that includes one end that is capable of detachably engaging the secondary platform connector 403 and one end that is capable of being in locking engagement to the hook member 107.

Figure 7A:
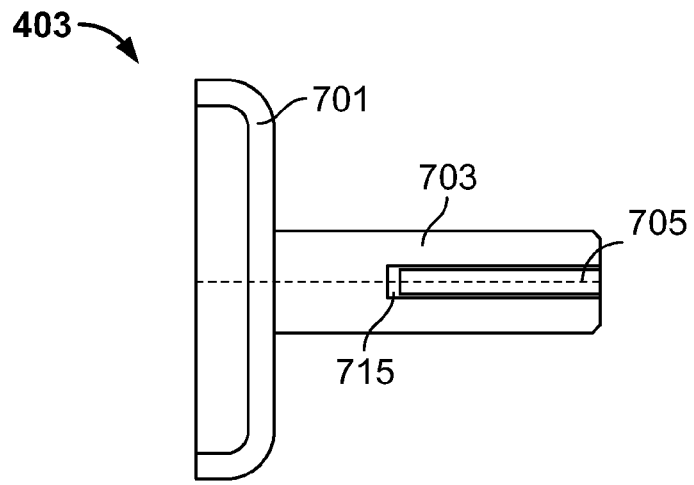
FIGS. 7A, 7B and 7C show orthogonal cutaway views of a secondary support connector according to an embodiment of the present invention.
Figure 7B:
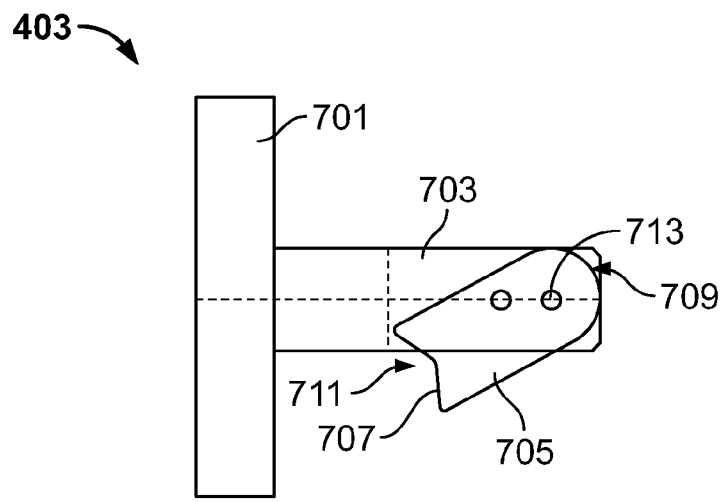
Figure 7C:
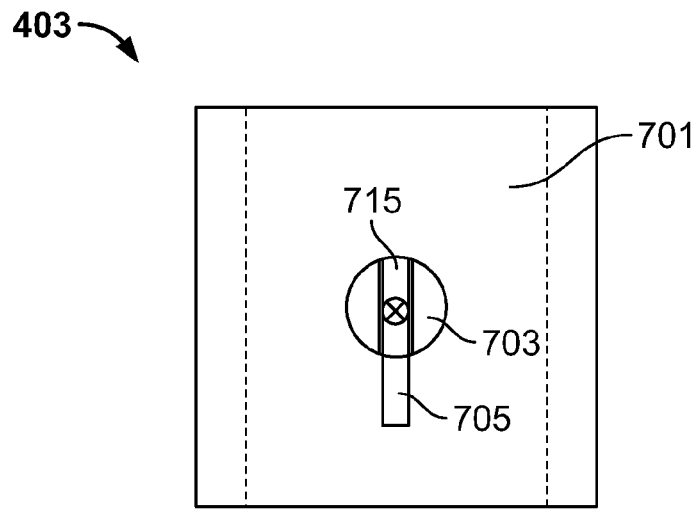

FIGS. 7A, 7B and 7C show cutaway views of secondary platform connectors 403 according to embodiments of the invention. FIGS. 7A, 7B and 7C show a platform attachment portion 701 that attaches to the platform member 101 (not shown in FIG. 7A, 7B or 7C). In addition, FIGS. 7A, 7B and 7C show a connector post portion 703 extending from the platform attachment portion 701. The connector post portion 703 is not limited to the cylindrical geometry having a tapered end shown, but may include any geometry that is capable of receiving and supporting the secondary support member 103 and reacting to a force from the platform member 101 through the secondary support member 103 to the primary support member 105 through the hook member 107. FIGS. 7A, 7B and 7C show an embodiment of the invention wherein a retention portion 705 has a substantially rectangular geometry with a rounded end 709 and a notched end 711 that permits the passage of the secondary support connector 303 in one direction, but prevents disengagement from the secondary platform connector 403 once the secondary support connector 303 is in an engaged position. The retention portion 705 shown in FIGS. 7A, 7B and 7C rotatably retracts when the secondary support connector 303 of the secondary support member 103 is directed over the connector post portion 703 of the secondary platform connector 403 and reextends once the secondary support member 103 is in an engaged position by force of gravity. Reextension of the retention portion 705 prevents disengagement of the secondary support member 103 from the secondary platform connector 403. The retention portion 705 extends substantially perpendicular to the connector post portion 703 and provides an engagement surface 707 that contacts and retains the secondary support connector 303 when the secondary support member 103 is engaged with the secondary platform connector 403. The retention portion 705 is not limited to the geometry shown in FIGS. 7A, 7B and 7C, but may be any geometry that permits the engagement of the secondary support connector 303 of the secondary support member 103 and prevents disengagement and is releasable under a force, such as a manual force that would be applied by hand or mechanical device during disassembly of the portable structure support system 100.

Figure 8:
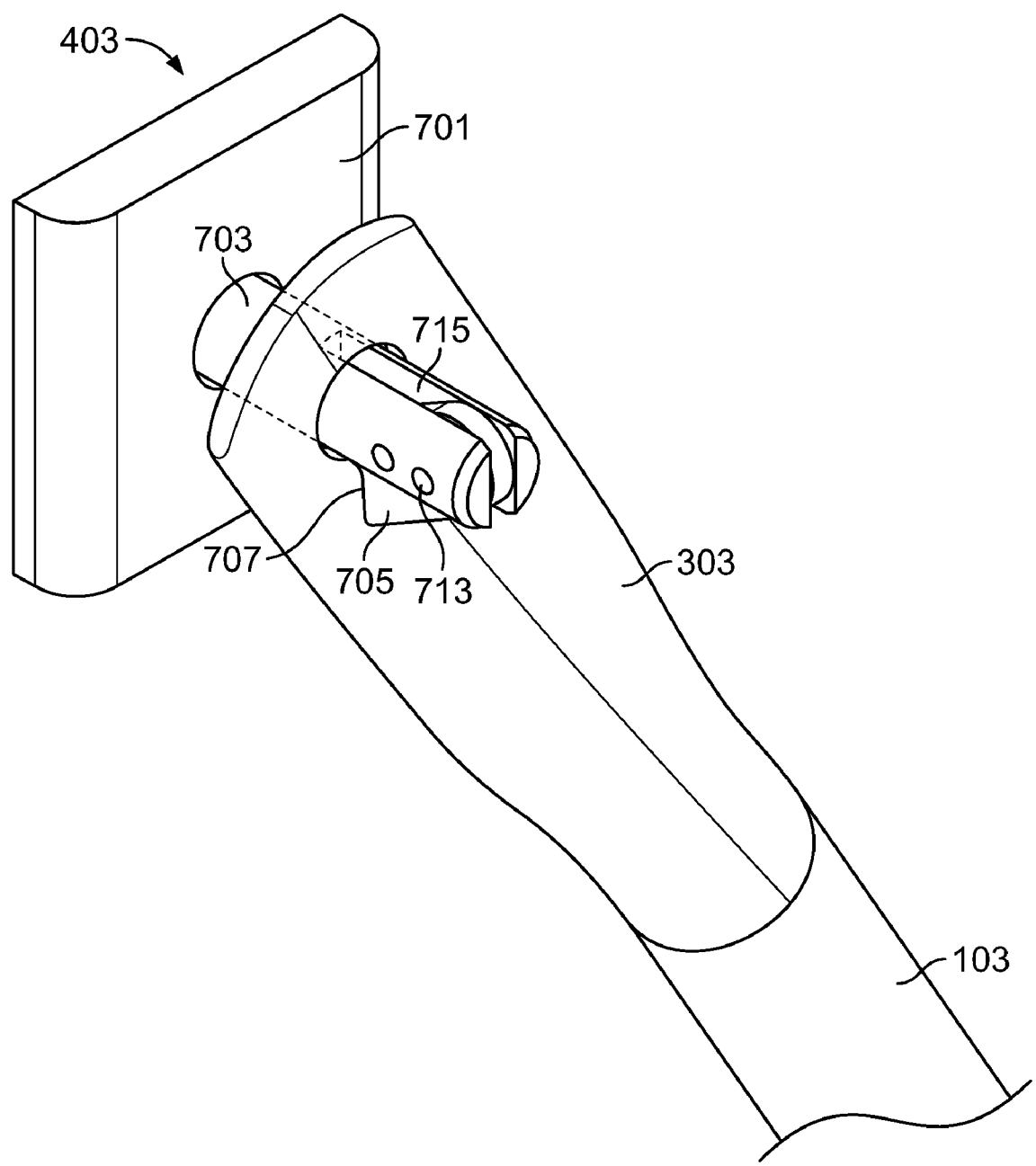
FIG. 8 shows a perspective view of a secondary support connector according to an embodiment of the present invention.

FIG. 8 shows a perspective view of a secondary platform connector 403 according to an embodiment of the present invention shown with a secondary support member 103 (shown in broken lines) when the secondary support member 103 is in an engaged position. When the secondary support member 103 is directed into engagement, the retention portion 705 yields by rotating about an axis defined by a pin 713 into a position into a slot 715 in the connector post portion 703 that permits the passage of the secondary support connector 303 over the retention portion 705. Reextension of the retention portion 705 takes place by rotation about the pin 713 axis out of the slot 715 via gravity once the secondary support member 103 is in an engaged position. The reextension may also be assisted by a force-providing device, such as a spring. Once the retention portion reextends, disengagement of the secondary support member 103 from the secondary platform connector 403 is substantially prevented. To disengage the secondary support member 103, the retention portion 705 may be manipulated by hand or mechanical device to rotate into the connector post portion 703, which permits the secondary support connector 303 to be directed away from the platform attachment portion 701 and to disengage from the secondary platform connector 403. The connection between the secondary platform connector 403 and the secondary support connector 303 is a detachable connection (i.e., detachable engagement), because the angular orientation between the secondary support member 103 and secondary platform connector 403 is not required to change to the effect disconnection therebetween.

Figure 9:
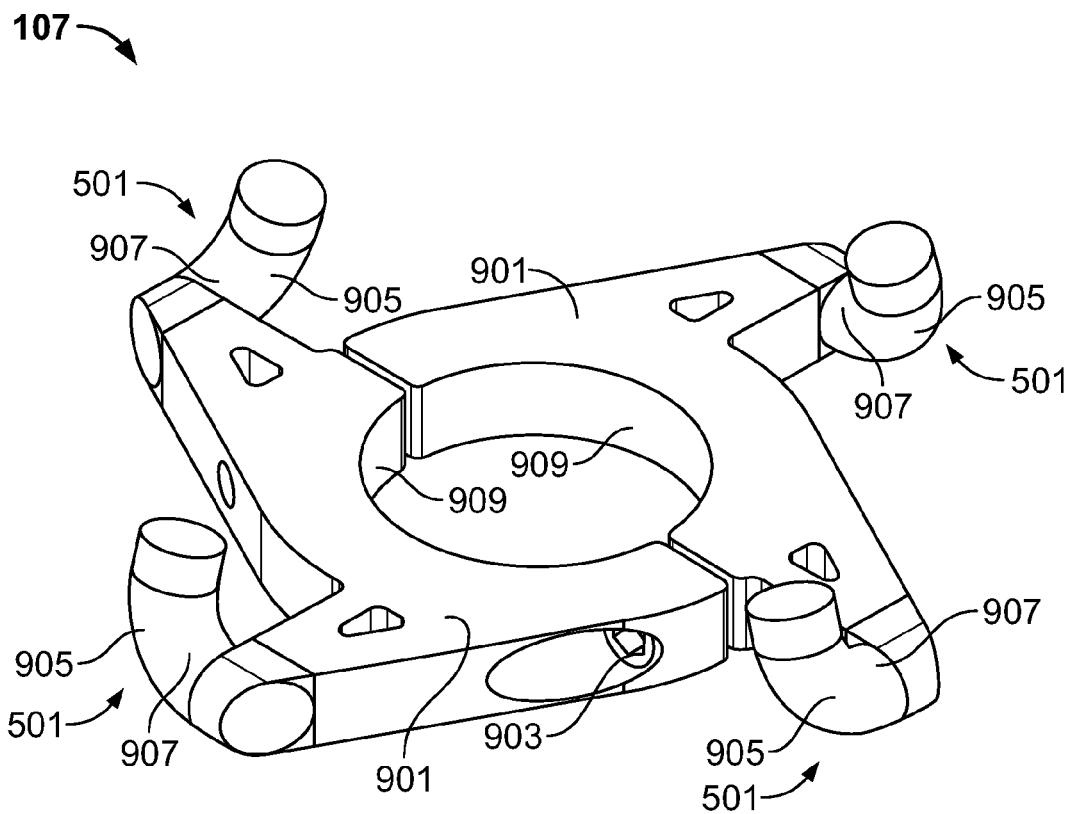
FIG. 9 shows a perspective view of a hook member according to an embodiment of the present invention.

FIG. 9 shows a hook member 107 according to an embodiment of the present invention. As shown and described with respect to FIG. 5, the hook member 107 includes a plurality of hook portions 501. The hook portions 501 extend from a hook member attachment portion 901. The hook member attachment portion 901 includes a geometry that is suitable for attachment to the primary support member 105. The attachment portion 901 embodiment shown in FIG. 9 includes a pair of clamp-like structures that are fastened together by fasteners 903. The attachment portion 901 includes an attachment surface 909 that attaches to the primary support member 105 (See FIG. 5) upon sufficient engagement of fasteners 903 to draw the attachment surfaces 909 into compressive contact with the primary support member 105. The attachment portion 901 is not limited to the geometry shown in FIG. 9, and may include any geometry that permits the attachment of the hook member 107 to the primary support member 105. The attachment of the hook member 107 to the primary support member 105 may take place using any suitable method, including frictional attachment provided by fasteners 903, adhesive, thermal shrink fit, welding or providing a unitary primary support member 105 having the structure of the hook member 107 integrally included. Although FIG. 9 shows four hook portions 501, the hook member 107 may include any number of hook portions 501 and may include a hook portion 501 for each support member 107 that is in locking engagement with the hook member 107. Additionally, the hook members 107 may be fabricated with a symmetrical arrangement of hook portions 501, such as the four hook portions 501 shown in FIG. 9, for ease of assembly and alignment of the primary support member 105 when the portable support structure 100 is assembled. The hook portions 501 include a curved portion 905 that has a radius of curvature that allows a secondary support connector 303 of a secondary support member 103 to be directed over the hook portion 501. The curved portion includes an engagement surface 907 that is capable of engaging the secondary support connector 303 and reacting to forces transmitted through the secondary support member 103. When the secondary support connector 303 is in position and in engagement with the engagement surface 907, the curved portion 905 locks the secondary support connector 303 in place and prevents disengagement, thereby retaining the secondary support member 103 in locking engagement.

Figure 10:
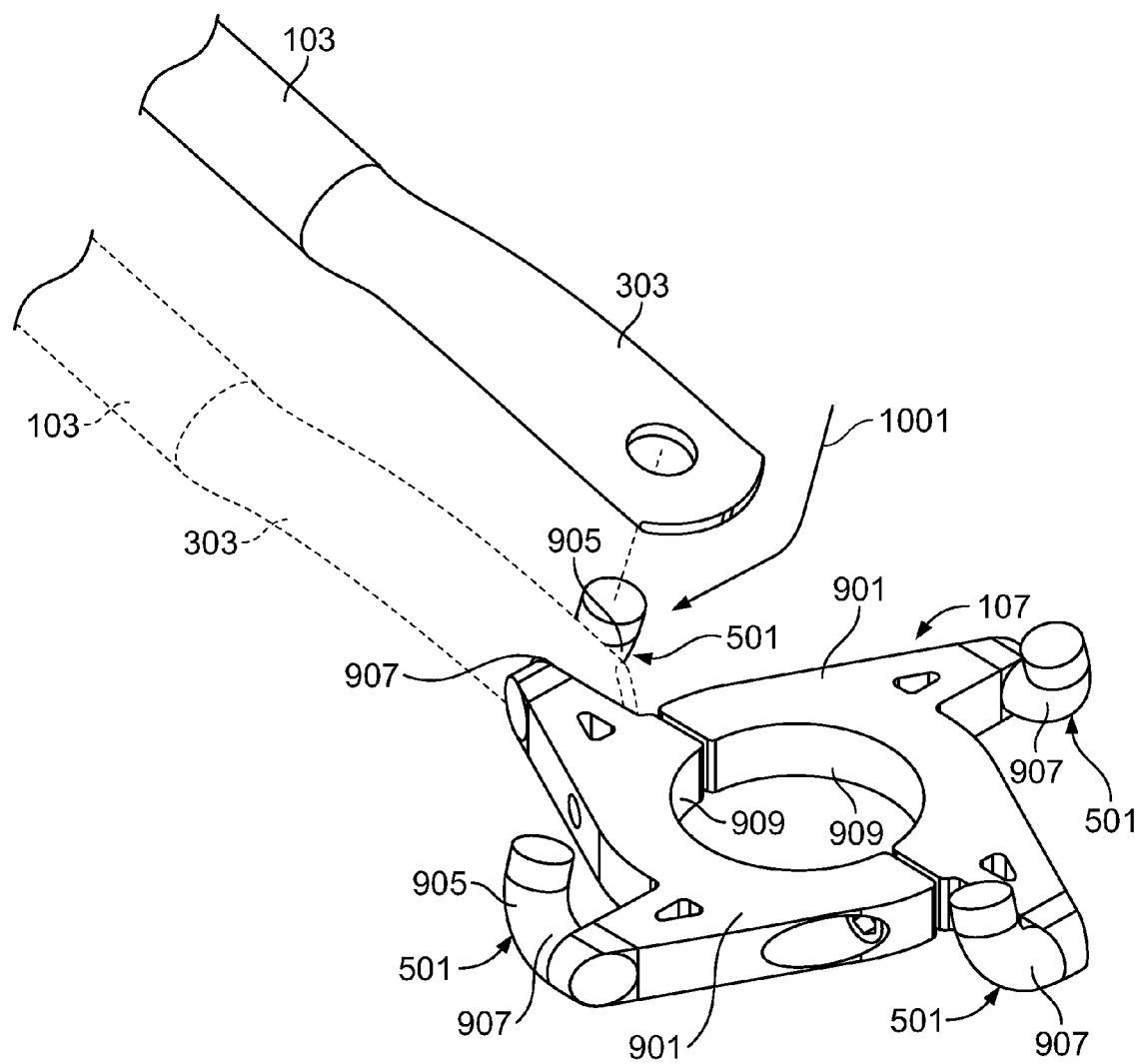
FIG. 10 shows a perspective view of a secondary support member in locking engagement with a hook member according to an embodiment of the present invention.

FIG. 10 shows a perspective view of the installation of the secondary support member 103 onto the hook member 107 during the assembly of the portable support structure 100. During the assembly of the portable support structure 100, the secondary support connector 303 of a secondary support member 103 is directed over a hook portion 501 of the hook member 107. The direction of the secondary support member is shown as arrow 1001, where the secondary support connector 303 is first aligned with the hook portion 501 and the secondary support connector 303 is then directed over the hook portion 501 and rotated over the curved portion 905 to engage engagement surface 907 where the secondary support connector 303 of the secondary support member 103 is in locking engagement (shown in broken lines) with the hook member 107. Locking engagement refers to the requirement that a change in angular orientation must occur between the secondary support connector 303 and the hook portion 501 to effect separation therefrom. Disengagement of the secondary support member 103 from the hook member 107 preferably takes place using an opposite motion as the arrow 1001 shown in FIG. 10. In addition, disengagement of the secondary support member 103 may be performed remotely, including, but not limited to, rotation of the secondary support member 103 from the distal end of the secondary support member 103 by personnel disassembling the portable support structure 100. Remote disengagement of the secondary support member 103 from the hook member 107 may permit personnel to disassemble the portable support structure 100 from a standing position or kneeling position, which reduces or eliminates the need from personnel to repetitively bend to disassemble the portable support structure 100.

Figure 11:
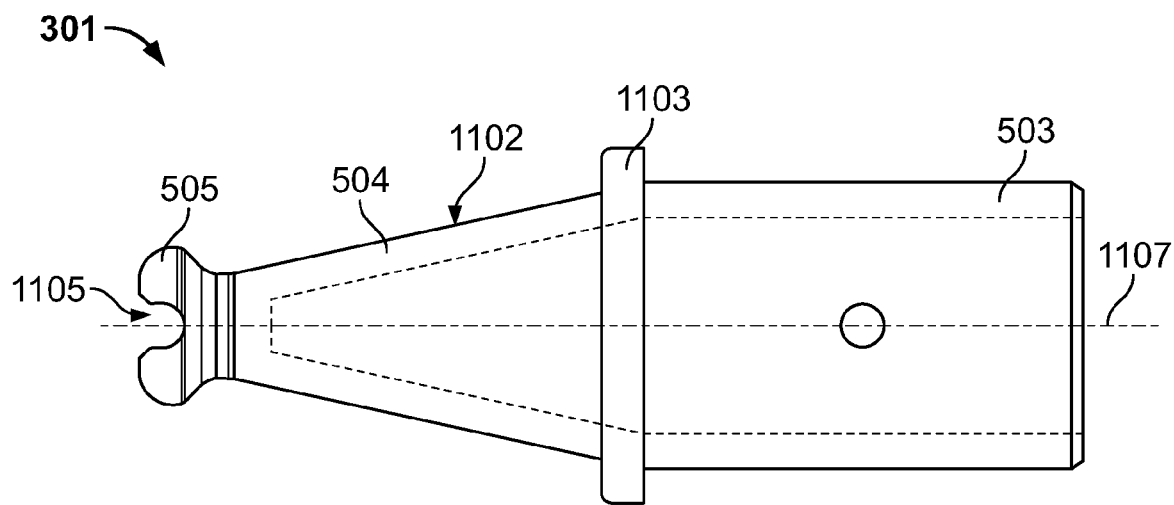
FIG. 11 shows an elevation view of a primary support connector according to an embodiment of the present invention.

FIG. 11 shows an enlarged cutaway view of a primary support connector 301 according to an embodiment of the present invention. The primary support connector 301 includes attachment portion 503 attached to flange portion 1103. As shown and described with respect to FIG. 5, the primary support member 105 is attached to the primary support connector 301. The primary support connector 301 further includes a tapered portion 504 extending from the flange portion 1103 that abuts an end of the primary support member 105. The tapered portion 504 includes an outer surface 1102, which is configured to engage a mating inner surface 1303 of the primary platform connector (see e.g., FIG. 15). The alignment member 505 is positioned at one end of the tapered portion 504. Alignment member 505 is configured to provide rotational alignment to the primary support connector 301 and the attached primary support member 105. The alignment member 505 includes an alignment channel 1105 for engaging an alignment pin 1307 (see FIG. 15) and retaining the primary support connector 301 in a fixed rotational position. The alignment channel 1105 is formed as a cavity in the alignment member 505 that is arranged in a direction substantially perpendicular to a connector center axis 1107 of the primary support connector 301.

Figure 12:
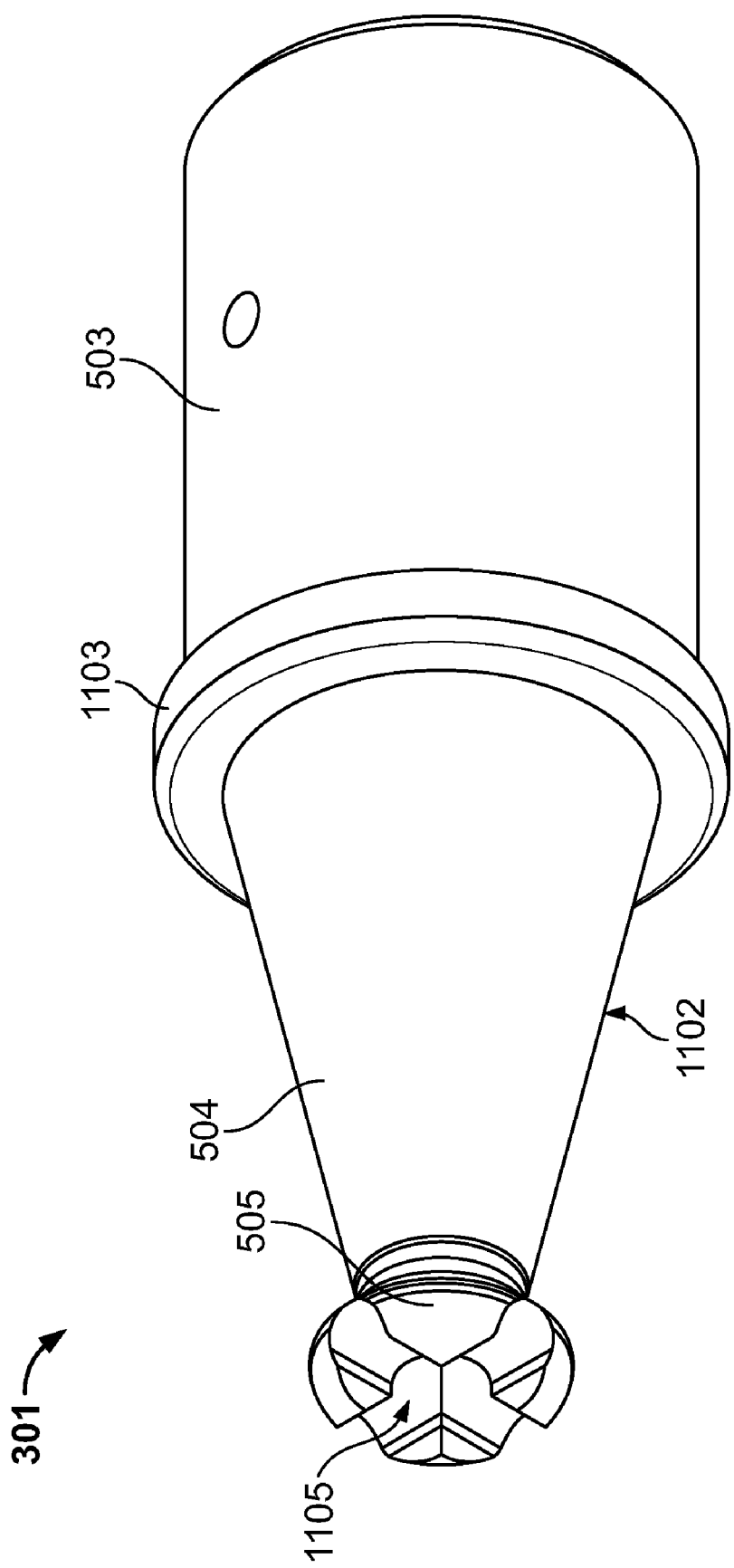
FIG. 12 shows a perspective view of a primary support connector according to an embodiment of the present invention.

FIG. 12 shows a perspective view of a primary support connector 301 according to an embodiment of the present invention. As shown and described in FIG. 11, the primary support connector 301 includes an attachment portion 503 attached to a flange portion 1103. The attachment portion 503 and flange portion 1103 have a substantially cylindrical geometry. Tapered portion 504 extends from the flange portion 1103 to alignment member 505. The tapered portion 504 has a substantially frusto-conical geometry, which has an outer surface 1102, which is configured to engage the inner surface 1303 of the primary platform connector 401 (see e.g., FIG. 15). The alignment member 505 includes alignment channels 1105 for engagement with the alignment pin 1307 (see e.g., FIG. 15). Although FIG. 12 shows two intersecting alignment channels 1105, any number of channels or a single channel may be used. The number of channels preferably corresponds to the number of alignment positions desired for the primary platform connector 301 and the attached primary support member 105.

Figure 13:
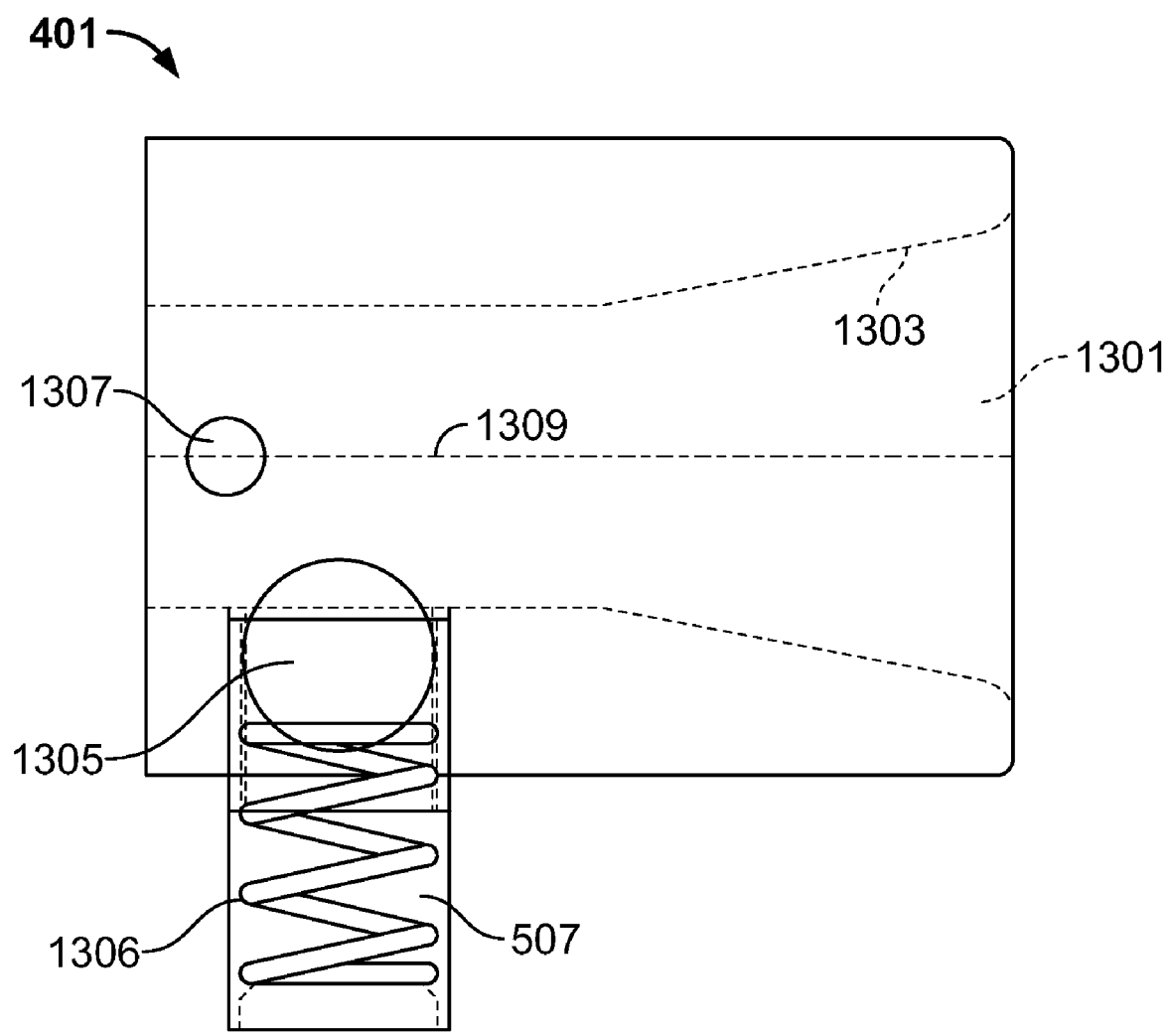
FIG. 13 shows an elevation view of a primary platform connector according to an embodiment of the present invention.

FIG. 13 shows an enlarged cutaway view of a primary platform connector 401 according to an embodiment of the present invention. The primary platform connector 401 includes a platform connector cavity 1301, which is configured with an inner surface 1303 to receive and engage the tapered portion 504 of the primary support connector 301. Alignment pin 1307 is positioned at a substantially perpendicular angle to the platform connector center axis 1309 within the primary platform connector 401 in a location such that the alignment pin 1307 engages the alignment channel 1105 of the primary support connector 301 when the primary support connector 301 is engaged with the primary platform connector 401. The primary platform connector 401 further includes a retention device 507, which provides a retaining force on the primary support connector 301, which holds the primary support connector 301 and the primary support member 105 in place, particularly during assembly of the portable support structure 100. The retention device 507 may include a tension providing device 1306 and a retainer ball 1305. The tension-providing device 1306 according to the present invention may be any device capable of providing a tensional force that may be translated through the retainer ball 1305, which retains the primary support connector 301 in position. A suitable tension-providing device includes, but is not limited to, a spring. The present invention is not limited to a retainer ball 1305 having the geometry shown in FIG. 13, but may include any geometry capable of engaging the alignment member 505 and the tapered portion 504 retaining the primary support connector 301 in position during the assembly of the portable support structure 100.

Figure 14:
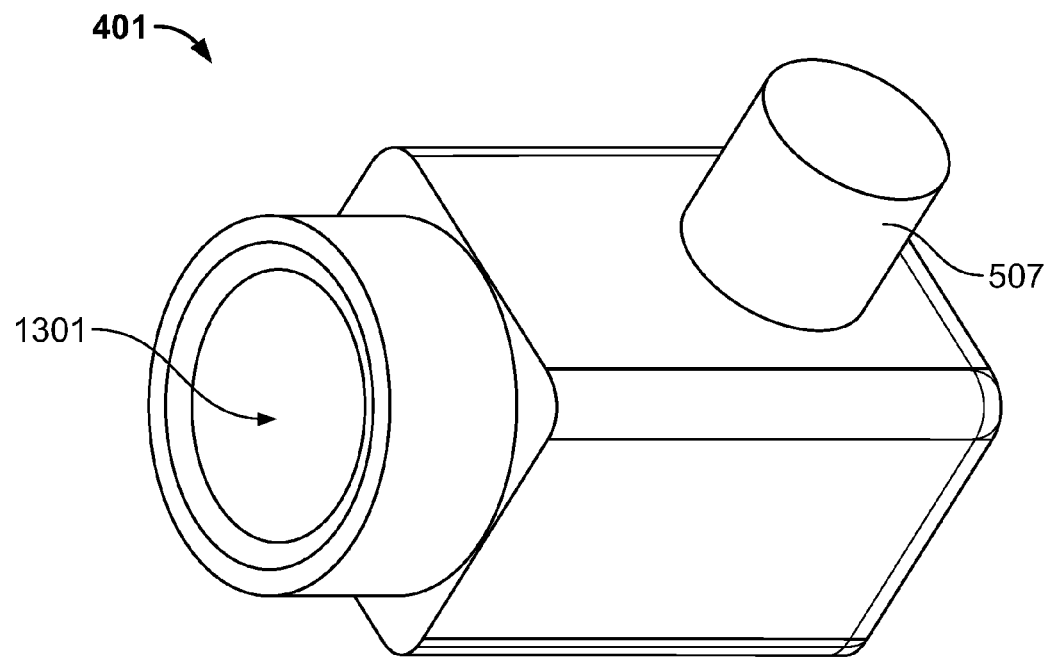
FIG. 14 shows a perspective view of a primary platform connector according to an embodiment of the present invention.

FIG. 14 shows a perspective view of a primary platform connector 401 according to an embodiment of the present invention. As shown and described in FIG. 13, the primary platform connector 401 includes a platform connector cavity 1301 at one end of the primary platform connector 401. The primary platform connector 401 has a substantially rectangular geometry that includes retention device 507 extending from one surface of the primary platform connector 401. Although the primary platform connector 401 shown in FIG. 14 is substantially rectangular, the primary platform connector 401 may be any geometry that can be attached to a platform member 101 (not shown in FIGS. 13-14) and can receive a primary support connector 301. The attachment of the primary platform connector 401 to the platform member 101 may take place using any suitable method including, but not limited to, adhesive, welding, mechanical fasteners, thermal interference (shrink fit), forming a unitary platform member 101 including the structure of the primary platform connector 401.

Figure 15:
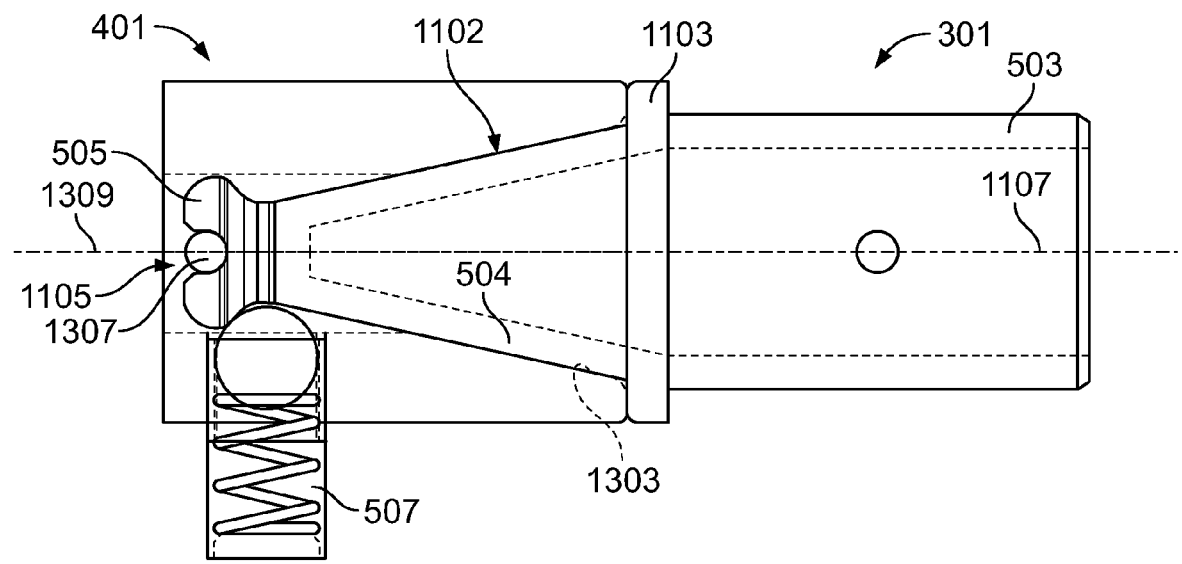
FIG. 15 shows an enlarged, partial elevation view of a primary support connector and primary platform connector engaged according to an embodiment of the present invention.

FIG. 15 shows a cross-sectional view of a primary support connector 301 engaged with a primary platform connector 401 according to an embodiment of the present invention. Outer surface 1102 of the primary support connector 301 engages the inner surface 1303 of the primary platform connector 401. The alignment pin 1307 of the primary platform connector 401 engages the alignment channel 1105 of the primary support connector 301 and substantially prevents rotation of the primary support connector 301 and the attached primary support member 105 (not shown in FIG. 15). Retention device 507 provides a retaining force on the primary support connector 301 at the junction between the alignment member 505 and tapered portion 504 to retain the primary support connector 301 inside the primary platform connector 401 and maintain the angular orientation of primary support member 105 with respect to axis 1107. The retention is preferably sufficient to maintain the engagement during assembly of the portable structure support system 100. A portion of the flange portion 1103 of the primary support connector 301 engages a portion of the primary platform connector 401 and provides a stop or abutting surface, which aligns the primary support connector 301 and provides additional support to the primary platform connector 401. The combination of the alignment by use of the alignment pin 1307 and the alignment channel 1105, the retention device 507 and the engagement of the outer surface 1102 with the inner surface 1303 provides an engaged structure capable of supporting a platform member 101 for a stage, platform or other structure capable of bearing the load of people and/or equipment. This combination also provides easy assembly of the portable support structure 100 allowing the primary support member 105 to remain engaged while the secondary support members 103 are being positioned and allowing the primary support members 105 to remain engaged to the platform members 101 during lifting of the platform members, such as the lifting that may occur during assembly of the portable support structure 100. In addition, this engagement of the primary support connector 301 and the primary platform connector 401 is releasable under a force, such as a manual force that would be applied by hand or mechanical device during disassembly of the portable structure support system 100.

The portable support structure 100 may include a plurality of platform members 101, including primary support connectors 401 and secondary platform connectors 403, primary support members 105, including primary support connectors 301, secondary support members 103, including secondary support connectors 303, may be fabricated each with substantially identical dimensions or marked with an identifier, such as colors, in order to allow the individual structural members to be interchanged, reducing the possibility for assembly error in the assembly of the multi-level structure. The interchangability of the various components permits easy assembly by persons having little or no technical skill.

The tapered geometry of the primary support connector 301 and the angle of the secondary support member 103 distributes forces from the platform member 101 allowing the structure to maintain stability, without platform deflection. In addition, the angled structure provides considerable lateral support to react lateral forces that may be present. The tapered geometry of the primary support connector 301 permits the platform member 101 and the primary support member 105 to be engaged prior to engaging the secondary support member 103. The tapered geometry provides the sufficient vertical and lateral support to support the platform member 101, even in the absence of secondary support members 103. This support permits the engagement of the primary support members 105, while the secondary support members 103 may be engaged at a later time. The later installation of the secondary support member 103 permits the assemblers of the portable support structure 100 to assemble the support structure more efficiently and in less time. In one embodiment of the invention, the secondary support members 103 may be omitted and the primary support members 105 provide the entire structural support for the platform member 101.

The tapered geometry of the primary support connector 301 and the presence of the retention device 507 also helps prevent misalignment of the structural members and allows people having little or no technical skill to correctly align the various components while maintaining a structure that is stable. In addition, the retention device 507 provides a force that retains the leg member in position during installation, making the installation easier. In particular, the retention device 507 provides a structure that does not undesirably disassemble when platform structure is raised or lifted, such as the raising or lifting that may occur during the assembly of the portable support structure 100.

The hook member 107 according to the present invention provides a releasable locking mechanism onto which the secondary support members 103 are easily and quickly installed. The hook portions 501 of the hook member 107 permit the installation and the locking engagement of the secondary support member 103 wherein the assembler of the portable support structure 100 may position and lock the secondary support member 103 while remaining in the standing position, making the installation quicker and less burdensome on the assembler, reducing back-related injuries caused by repetitive tasks.

Example

Table 1 shows the assembly time ratio for an Example according to an embodiment of the invention and a Comparative Example according to a prior art portable support structure. The assembly time ratio is defined as total assembly time, in man-hours, divided by the portable support structure platform size in 1000 ft$^2$. Both the Example and Comparative Example are portable structures forming a platform 60 feet long, 40 feet wide, with a height (i.e., platform elevation) of 5 feet. The Example according to the present invention utilizes the portable support structure 100 having both the primary support members 105 and secondary support members 103, which assemble substantially as shown in FIG. 1. Comparative Example includes a prior art portable support structure, including known primary and secondary supports, utilizing known connections.

TABLE 1

| | Length (ft) | Width (ft) | Portable Structure Platform Size (ft$^2$) | Time to Assemble Entire Structure (hours) | Number of Assemblers | Man-Hours for Assembly of Entire Structure (hours) | Assembly Time Ratio (Man-Hours/1000 ft$^2$ of platform) |
|---|---|---|---|---|---|---|---|
| Example | 60 | 40 | 2400 | 0.75 | 3 | 2.25 | 0.94 |
| Comparative Example | 60 | 40 | 2400 | 1 | 6 | 6 | 2.5 |

As shown in Table 1, the Example according to the present invention has an assembly time ratio of 0.94, which is about 62.4% lower than the assembly time ratio of the Comparative Example of 2.5. The total time to assemble the 2400 ft$^2$ portable support structure is 45 minutes (0.75 hours), with three assemblers, corresponding to 2.25 man-hours to assemble the 2400 ft$^2$ structure. The prior art Comparative Example assembles in 1 hour, with six assemblers, corresponding to six man-hours to assemble the 2400 ft$^2$ structure. The assembly of the Example portable support structure is accomplished with less assemblers, three compared to six for the Comparative Example. In addition, the Example is assembled in less total time, 0.75 hours compared to 1 hour for the Comparative Example.

Table 2 shows the storage space ratios of the Example and Comparative Examples. As discussed above with respect to the assembly time ratio, the Example and Comparative Example have platforms of substantially identical size (i.e., 40 feet wide, 60 feet long, 5 feet high and total platform area of 2400 ft$^2$). The Example according to the present invention utilizes the portable support structure 100 having both the primary support members 105 and secondary support members 103, which assemble substantially as shown in FIG. 1. Comparative Example includes a prior art support structure, including known primary and secondary supports, utilizing known connections. The storage space is the length of a standard tractor-trailer utilized to store the disassembled portable support structure at a substantially maximum packing density. A standard tractor-trailer is defined as the type of tractor-trailer typically used for transportation of concert stages, having a storage space width of about 100 inches and a storage space height of about 110 inches. The storage space ratio is defined as the length of storage space utilized to store the portable support structure (i.e., the length of the tractor-trailer) at a substantially maximum packing density divided by 1000 ft² of platform area.

TABLE 2

| | Length (ft) | Width (ft) | Height | Portable Structure Platform Size (ft²) | Storage Length (ft) | Storage Space Ratio (storage length/ 1000 ft²) |
|---|---|---|---|---|---|---|
| Example | 60 | 40 | 5 | 2400 | 27.25 | 11.35 |
| Comparative Example | 60 | 40 | 5 | 2400 | 38 | 15.83 |

As shown in Table 2, the Example according to the present invention has a storage space ratio of 11.35, which is about 28.3% lower than the storage space ratio of the Comparative Example of 15.83. The storage of the 2400 ft² portable support structure of Example is accomplished in 27.25 ft of storage length, which is 10.75 ft less than the 38 feet utilized for the 2400 ft² portable support structure of Comparative Example. Similar storage efficiencies would be achieved in the cargo holds of aircraft, ships or other transportation vehicles.

Time for assembly and disassembly of the portable support structure 100 of the present invention is significantly reduced compared to known systems. In industries, such as the music industry, labor is a significant percentage of the cost relating to production of concert events and the like. The portable support structure 100 according to the present invention may utilize at least 50% fewer personnel to assemble and disassemble the portable support structures 100 than a prior art portable support structure. The time to assemble/disassemble the portable support structures 100 is also reduced, wherein the structure may be assembled in at least 33% less time than a prior art portable support structure. Assembly in at least 33% less time may also be accomplished in combination with the at least 50% fewer assemblers, allowing the portable support structure to be assembled in at least 33% less time with at least 50% fewer assemblers. A reduction in either the workforce required to assemble and disassemble a portable support structure 100 and/or a reduction in the amount of time required to assemble and disassemble a portable support structure 100 significantly reduces the costs related to a concert event utilizing the portable support structure 100.

The portable support structure 100 according to the present invention also has the advantage that the disassembled structure takes up a significantly reduced volume as compared with known portable support structures. The portable support structure 100 according to the present invention may be stored and/or transported in at least 25% less space than a prior art portable support structure. This reduction in storage volume permits reduced storage and transportation costs.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A connector system for connecting components of a support structure in proper orientation, the connector system comprising:
    a male support connector having a flange portion, a flared end, and a tapered portion disposed between the flange portion and the flared end, the flared end having an alignment channel cross an end surface; and
    a female platform connector having a tapered connector cavity and an alignment pin across the tapered connector cavity, the female platform connector being configured to receive the flared end and the tapered connector cavity being configured to receive the tapered portion of the male support connector and to detachably engage the male support connector only when the male support connector is rotationally oriented such that the alignment channel is engaged by the alignment pin.

2. The connector system according to claim 1, further comprising a retention device configured and disposed to releasably retain the male support connector in the female platform connector.

3. The connector system according to claim 2, wherein the retention device includes a ball and a spring, the ball being configured to contact the flared end when the female platform connector and the male support connector are engaged.

4. The connector system according to claim 1, wherein the tapered portion includes a frusto-conical geometry.

* * * * *